United States Patent [19]

Prough et al.

[11] Patent Number: 5,690,341
[45] Date of Patent: Nov. 25, 1997

[54] METHOD AND APPARATUS FOR THE FACILITATING THE SERVICING OF DRIVE-SHAFT ASSEMBLIES FOR PRESSURIZED VESSELS

[75] Inventors: J. Robert Prough, Queensbury; William A. Kerpka, Glens Falls; John F. Bolles, Queensbury, all of N.Y.

[73] Assignee: Ahlstrom Machinery Inc., Glens Falls, N.Y.

[21] Appl. No.: 665,284

[22] Filed: Jun. 17, 1996

[51] Int. Cl.⁶ ............................................. F16J 15/54
[52] U.S. Cl. .................................... 277/9; 277/9.5
[58] Field of Search .................... 277/2, 3, 9, 9.5, 277/53, 170, 115, 117, 173, 174, 64, 70; 162/251, 243

[56] References Cited

U.S. PATENT DOCUMENTS

| | | | |
|---|---|---|---|
| 2,571,802 | 10/1951 | Wiefley et al. | 277/64 |
| 3,126,207 | 3/1964 | Eikelberner | 277/64 |
| 3,471,157 | 10/1969 | Swearingen | 277/174 |
| 4,289,317 | 9/1981 | Kuc | 277/117 |
| 4,386,786 | 6/1983 | Agrama | 277/170 |
| 4,878,677 | 11/1989 | Larkins et al. | 277/64 |
| 5,102,151 | 4/1992 | Stolzenfeld | 277/6 |
| 5,562,294 | 10/1996 | Marsi | 277/174 |
| 5,567,262 | 10/1996 | Phillips et al. | 162/251 |

Primary Examiner—Scott Cummings
Attorney, Agent, or Firm—Nixon & Vanderhye P.C.

[57] ABSTRACT

Apparatus and a method allow shaft packings and bearing assemblies to be serviced for a shaft penetrating a pressurized vessel without requiring the vessel to be emptied.

21 Claims, 6 Drawing Sheets

METHOD AND APPARATUS FOR THE FACILITATING THE SERVICING OF DRIVE-SHAFT ASSEMBLIES FOR PRESSURIZED VESSELS

BACKGROUND AND SUMMARY OF THE INVENTION

In the Pulp and Paper industry, as well as in other Process Industries, chemical reactions are often performed under pressures greater than atmospheric pressure. Typically, these reactions are performed within vessels which are specially designed to retain the pressures, and also the temperatures, required for the reaction, for example chemical reactors or pulp digesters. The processes performed, either batch or continuous, often require some form of agitation or stirring during the process. This agitation is typically effected by some form of shaft-driven agitator which is typically powered by an electric motor via some form of power transfer device, for example, belts, drive chains, or a gear reducer. However, since the drive shaft of the agitator penetrates the wall of pressure vessel, some form of structural support must be provided to maintain the integrity of the vessel wall where it has been penetrated. Some form of seal must also be provided to prevent the pressurized, typically heated, sometimes harmful, contents of the vessel from escaping out the clearance between the typically cylindrical shaft and the opening in the vessel. Also, some form of bearing is typically provided to reduce friction between the rotating or reciprocating shaft and the support housing.

This seal is typically provided by a rope-type fabric, or "packing", or elastomeric seal ring, or some form of "mechanical" sealing arrangement. For example, the packing is typically installed in a stationary cavity or "packing box" or "pack box" that surrounds the shaft and is retained by a retaining ring or "gland". The rotating shaft bears against the stationary packing and the packing prevents the contents of the vessel from escaping. Typically, to reduce the wear rate of the softer packing some form of wear-resistant material is incorporated into the packing. For example, the packing may include a polytetraflouroethylene(PTFE)-containing material, for example, Dupont's Teflon® material. Typically, the bearings used are roller bearings, for example, spherical or cylindrical anti-friction bearings, or a journal-type bearing which is self-lubricating or has reduced-friction properties.

As with all rotating machinery, the support housing, the bearings, and the seals are subject to wear and typically must be inspected and replaced at regular intervals to repair or replace damaged or malfunctioning hardware. As is often the case, to prevent personal or property damage when such hardware is serviced, the vessel must be depressurized and the contents removed. For small vessels, this is not inconvenient, but for a large vessels, for example a pulp digester, the cost of time and lost production can be significant. For example, at one pulp mill the cost of emptying a continuous pulping digester in order to replace packings is approximately $3 million.

The present invention provides a method and apparatus for servicing the support, the seals, and the bearings of a shaft which penetrates a treatment vessel, which eliminates the need for evacuating the vessel prior to servicing.

According to one aspect of the present invention there is provided an apparatus for preventing fluid leakage from a vessel having a shaft penetrating the vessel during servicing of shaft components. The apparatus comprises the following structures: A first bearing surface that is substantially stationary with respect to the vessel. A second bearing surface mounted to and movable with the shaft, and during normal operation of the shaft is spaced from the first bearing surface, the first and second bearing surfaces operatively located closer to the vessel than the shaft components to be serviced. And a shaft support structure for supporting the shaft to allow servicing of the shaft components, the shaft support structure engaging the shaft when stationary and moving at least part of the shaft with respect to the vessel so that the first and second bearing surfaces come into substantially liquid-tight sealing engagement with each other, allowing servicing of the shaft components without emptying the vessel.

Preferably the first and second bearing surfaces are substantially conical mating surfaces; more preferably the conical mating surfaces have a length along the shaft of less than 5 inches (e.g. about 2 inches or less), the conical mating surfaces are metal, and at least one of the metal conical mating surfaces is case hardened, or surface treated or coated with a hard material (e.g. chromium or titanium dioxide containing materials), providing a smooth wear-resistant surface.

A cylindrical journal bearing may be provided (e.g. in place of a packing in conventional structures) between the shaft and the vessel on the opposite side of the first bearing surface from the second bearing surface.

The shaft may have a ledge; and the shaft support may comprise at least one ledge engaging element, and a first plurality of removable fasteners extending from the edge engaging element into removable contact with the vessel. Preferably the ledge is substantially continuous, and the at least one ledge engaging element comprises a multi-piece collar, each piece of the multi-piece collar engaging the ledge and connected by a the removable fastener to the vessel.

Typically one of the shaft components comprises a packing including a packing gland connected by a second plurality of removable fasteners to an outer portion of the vessel; and wherein the first plurality of fasteners are connectable to the outer portion of the vessel adjacent the second plurality, and wherein the packing gland is dimensioned and shaped to be removable from the packing without interference from the at least one ledge engaging element. The shaft components may further comprise at least one bearing assembly for mounting the shaft for rotation or reciprocation during use; and wherein the first and second bearing surfaces are substantially conical metal mating surfaces.

The vessel preferably comprises a cellulose pulp containing vessel, and the shaft is preferably rotatable, to act on the pulp in the vessel. Preferably the shaft support structure is reciprocal with respect to the vessel to move the second bearing surface into substantially liquid-tight engagement with the first bearing surface.

There may also be means for injecting a sealing compound between the first and second bearing surfaces (either to facilitate the formation of a seal between them, or in response to an aberrant situation). This means may comprise any conventional passages, nozzles, jets, or the like, activated by electrical, fluid powered, manually powered, mechanically actuated, or like structures. There may also be means for sensing if there is an ineffective seal between the first and second bearing surfaces and initiating action intended to be corrective (e.g. activating an alarm or indicator, injecting a sealing compound, or the like). These means may be any conventional sensing and activating means including gauges, conductivity sensors, pressure sensors, liquid sensors, flow sensors, or the like, and any conventional audible or visual or tactical alarm or indicator.

According to another aspect of the invention, a shaft assembly is provided which comprises: A shaft having an axis of elongation, a first end, a second end, and a ledge between the first and second ends. A packing, including a packing gland, mounted on the shaft spaced from the first end thereof, and closer to the first end than is the ledge. At least one ledge engaging element engaging the ledge on the opposite side of the ledge from the packing gland; and a plurality of removable fasteners operatively connected to the at least one ledge engaging element and capable of connecting the element to a stationary surface and drawing the element, and the shaft, toward the stationary surface. The packing gland and the at least one ledge engaging element being positioned, shaped and dimensioned so that the packing gland can be moved away from the packing, toward the shaft second end, without interference by the at least one ledge engaging element, so that the packing may be serviced.

The shaft assembly may further comprise a bearing surface mounted on the shaft for at least reciprocal movement therewith, for engaging a complimentary stationary bearing surface and providing substantially liquid-tight engagement therewith. The shaft bearing surface comprises a conical metal surface having a length along the axis of less than 5 inches (e.g. less than about 2 inches). The ledge is preferably substantially continuous, and the at least one ledge engaging element comprises a plurality of elements connectable to each other and to the plurality of removable fasteners. The shaft assembly may further comprising at least one bearing assembly mounted to the shaft on the opposite side of the ledge from the first end.

According to yet another aspect of the present invention there is provided a method of servicing shaft components, including at least a bearing assembly and/or a packing, of a vessel having fluent material therein, the shaft penetrating the vessel and moveable with respect to the vessel to act on the fluent material within the vessel. The method comprises the steps of substantially sequentially: (a) Terminating the fluent material acting movement of the shaft with respect to the vessel. (b) Creating a substantially fluent material-tight seal between the shaft and the vessel, the seal between the interior of the vessel and the shaft components to be serviced. (c) While the seal is maintained, servicing the shaft components, including at least a bearing assembly and/or a packing, without emptying the fluent material from the vessel. "Servicing" as used in the present specification and claims means partly and/or completely repairing, refurbishing, and/or replacing the shaft components, such as bearing assemblies and packings. And (d) releasing the substantially fluent material-tight seal and initiating fluent material acting movement of the shaft.

The method preferably further comprises the step of sensing if the fluent material-tight seal is significantly leaking, and initiating action intended to correct the leakage (e.g. activating an alarm or indicator, injecting a sealing compound into the shaft/vessel area, etc.). Step (b) may be practiced by linearly moving a conical bearing on the shaft into operative engagement with a conical bearing on the vessel. The shaft may have a ledge supporting a leaking liquid deflector; and step (b) may be further practiced by replacing the deflector with at least one shaft supporting element which engages the ledge, and drawing the element toward the vessel.

It is the primary object of the present invention to provide a mechanism and method of being able to service packings, bearing assemblies, and the like associated with a shaft penetrating a vessel without requiring the vessel to be emptied of its contents. This and other objects of the invention will become clear from the detailed description of the invention, and from the appended claims.

DETAILED DESCRIPTION OF THE DRAWINGS

Although this invention will be described in reference to what is known in the art as an "outlet device" for a continuous digester, it is understood that this invention is applicable to any shaft, either rotating or reciprocating or stationary, that penetrates the wall of a fluid containing vessel, either pressurized or unpressurized.

Figure 1:
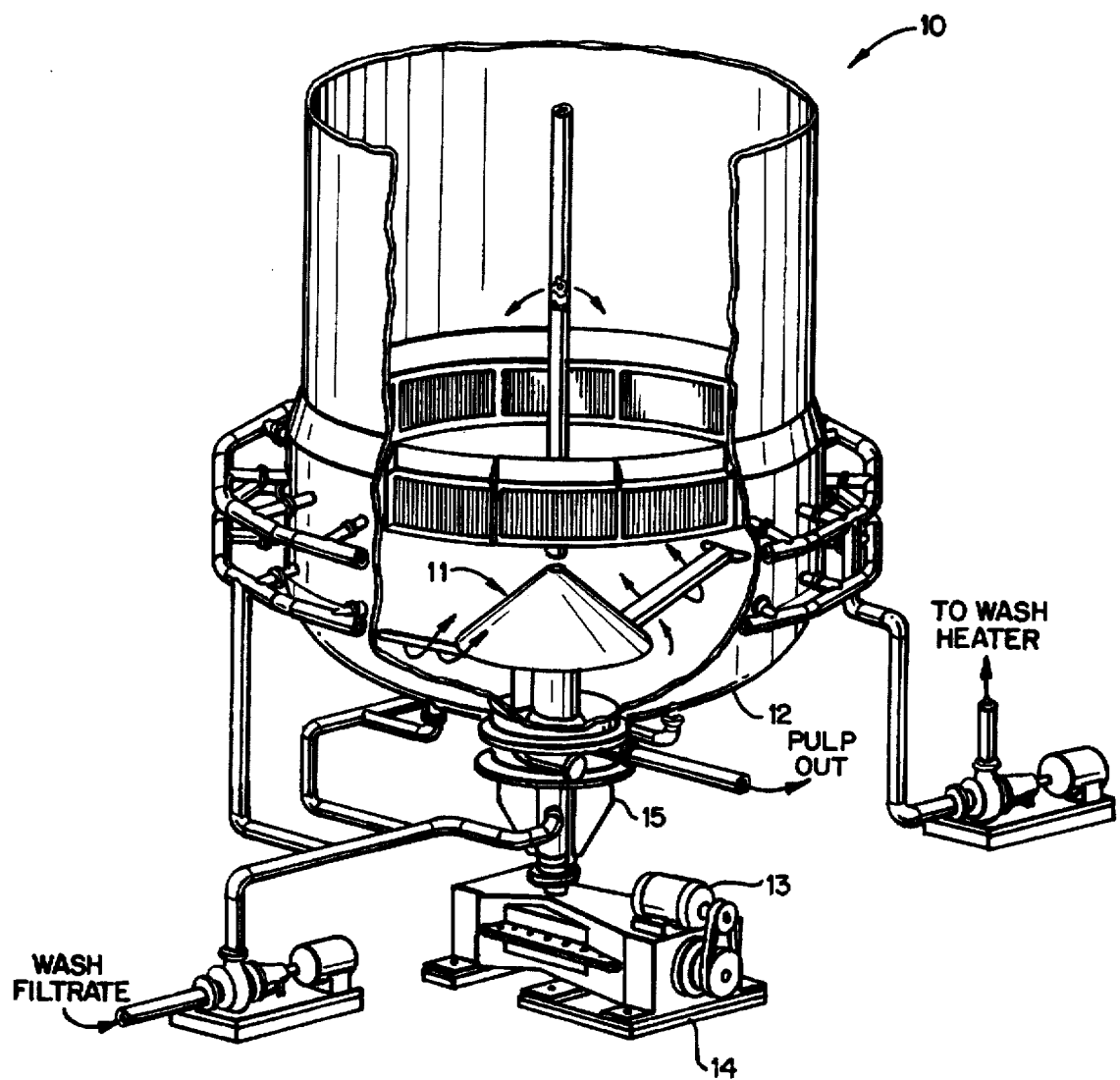
FIG. 1 is a partial perspective view, with portions of the vessel cut away for clarity of illustration, of a conventional prior art vessel with shaft, and shaft operating and supporting components.

FIG. 1 illustrates the bottom section 10, of a Kamyr® continuous digester, as sold by Ahlstrom Machinery of Glens Falls, N.Y. This vessel is used for the continuous chemical pulping of comminuted cellulosic fibrous material, for example, softwood chips. The comminuted cellulosic fibrous material enters the top of the vessel (not shown) and passes downward as it is treated with pulping chemicals at superatmospheric pressure, typically 0.1 to 20 bar (0.1 to 300 psi), preferably 5 to 15 bar (70 to 220 psi), and at a temperature greater than 100° C., typically between 130° and 180° C. After the pulping reaction is essentially completed, the pulped comminuted cellulosic fibrous material is discharged from the bottom of the digester 10, by means of a rotating outlet or discharge device 11, mounted in the bottom head 12. The outlet device 11, is typically driven by means of an electric motor 13, via a speed reducer 14. In this application, the outlet drive is typically driven at a speed between 1 and 20 rpm, preferably, 5 to 15 rpm, though in other applications the shaft rotational speed may be higher. The outlet device 11, is supported in a support assembly 15 which includes bearings to support the weight and load on the rotating device and seals to prevent leakage of process fluids. The present invention is an improvement of this support assembly 15 such that the bearings, seals and other hardware are more easily serviced.

Figure 2:
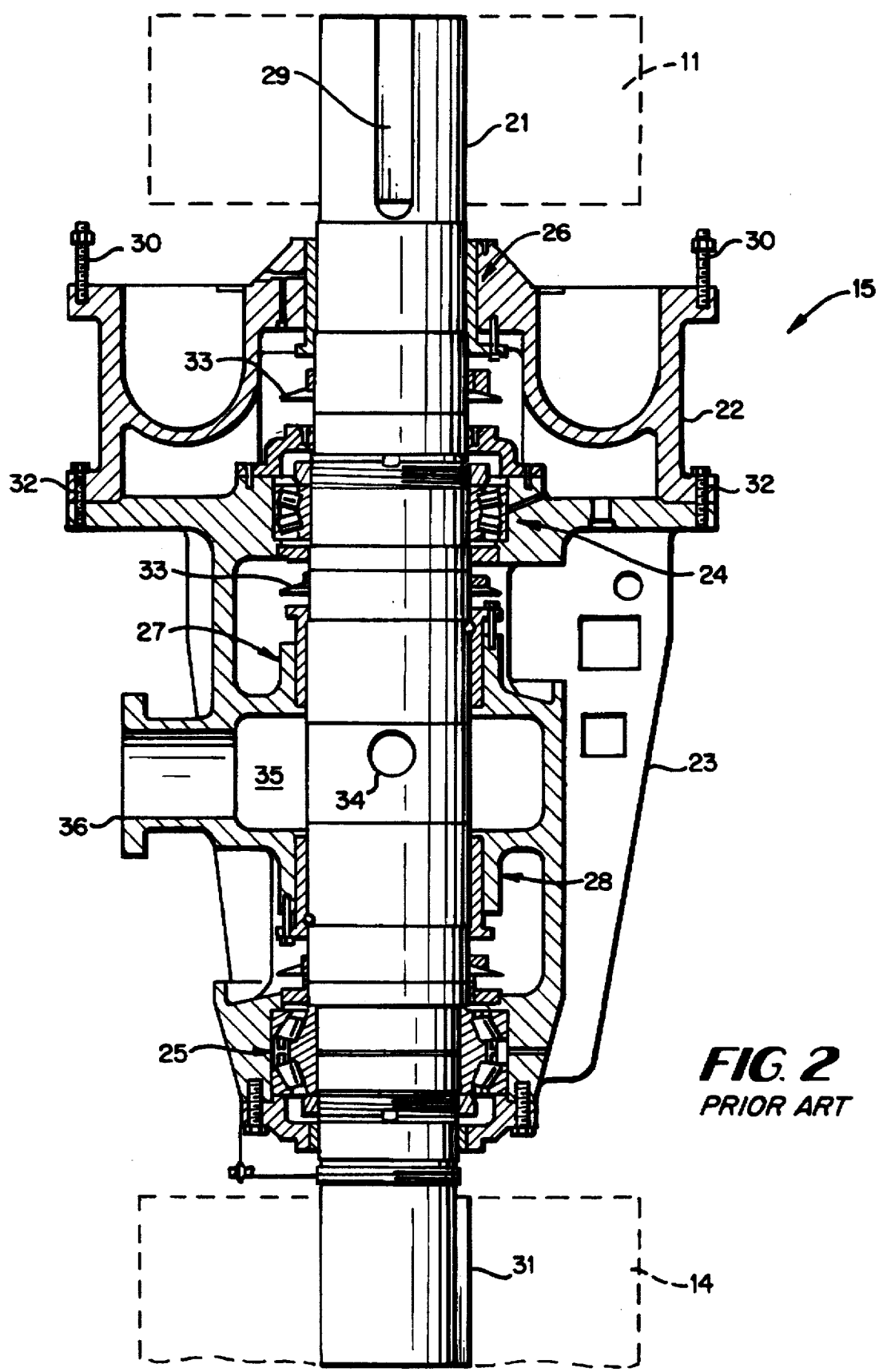
FIG. 2 is a side view, partly in cross-section and partly in elevation, of the shaft, and vessel where it interfaces the shaft, of the prior art structure of FIG. 1.
Figure 3:
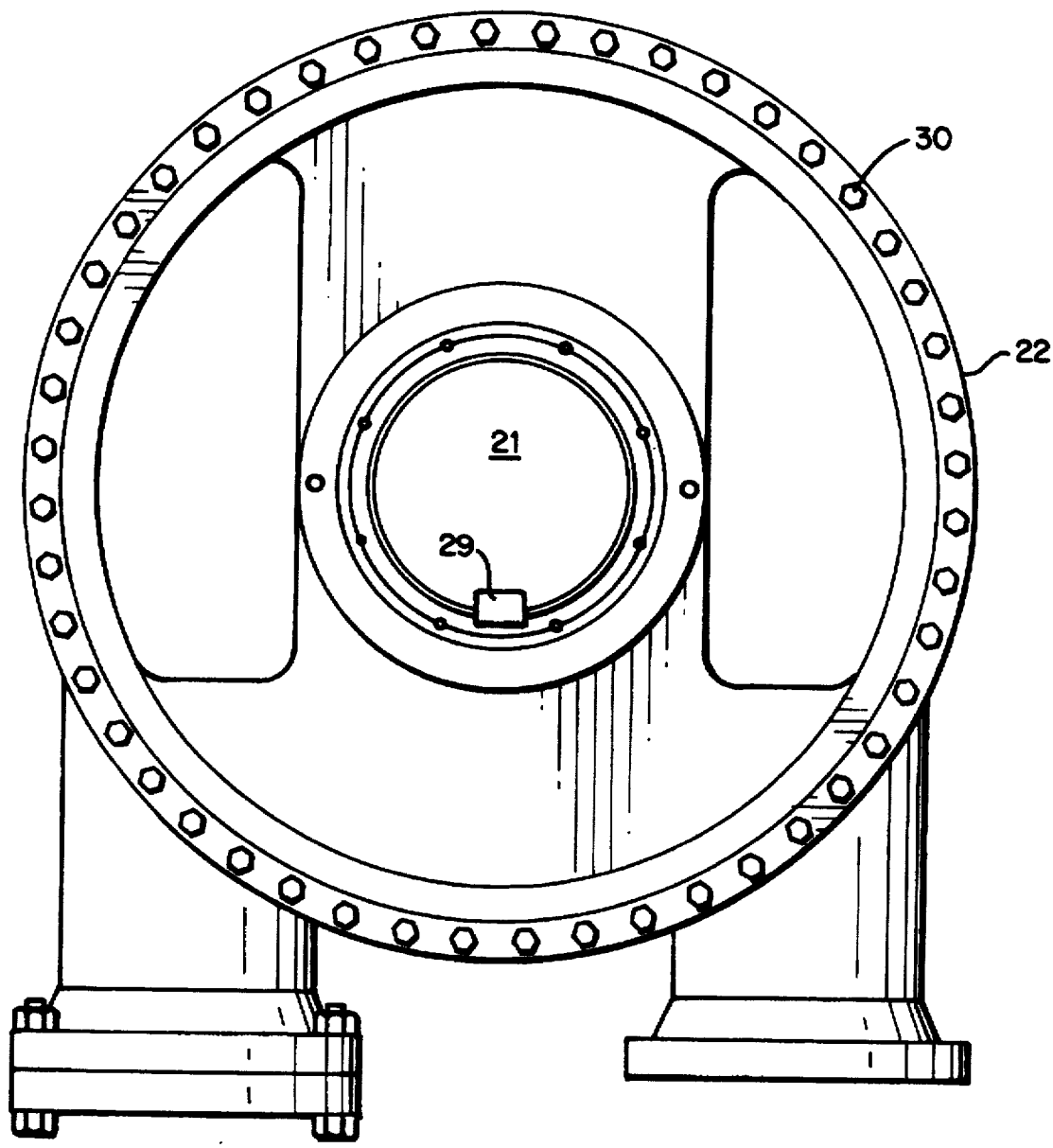
FIG. 3 is a top plan view of the prior art structure of FIG. 2.

FIGS. 2 and 3 show an elongated drive shaft 21, having a first end with a drive key 29, which engages the outlet device 11, shown in FIG. 1, and a second end having a second key 31, which engages a drive mechanism, for example, the gear reducer, 14, of FIG. 1. The shaft 21 rotates about an axis. The support structure shown in FIGS. 2 and 3 consists of an upper housing 22, which attaches to the bottom head 12 in FIG. 1, by means of threaded bolts or studs 30. A second housing 23 attaches to housing 22 via bolts or studs 32. This prior art assembly includes two roller bearing assemblies 24 and 25, and three packing or seal assemblies 26, 27, and 28. The shaft 21 may also include one or more liquid deflectors or "flingers" 33, which protect the bearing assemblies 24, 25 from leakage from above. The shaft 21 may also include an internal cavity, not shown, which is in liquid communication with one or more orifices 34 which are in further liquid communication with an annular cavity 35, which receives treatment fluid via conduit 36. This fluid, for example, "cold blow" filtrate, is typically passed through the internal cavity in the shaft 21 and is distributed to distribution conduits, not shown, in the outlet device 11 of FIG. 1.

In this prior art assembly of FIGS. 1 through 3, should any of the housings 22 and 23, or the bearing assemblies 24 and 25, or packing assemblies 26, 27 and 28, require servicing or replacement, either the housing 22 or the housing 23 must be removed to access the bearings or packing. In order to do this, the contents of the vessel 10 in FIG. 1, must be depressurized, evacuated, and, if toxic gases are present, ventilated prior to servicing. This typically can take several hours, if not days, to prepare-even before servicing of the bearings or seals is to begin. This effort and the consequent loss in production can cost a mill millions of dollars.

Figure 4:
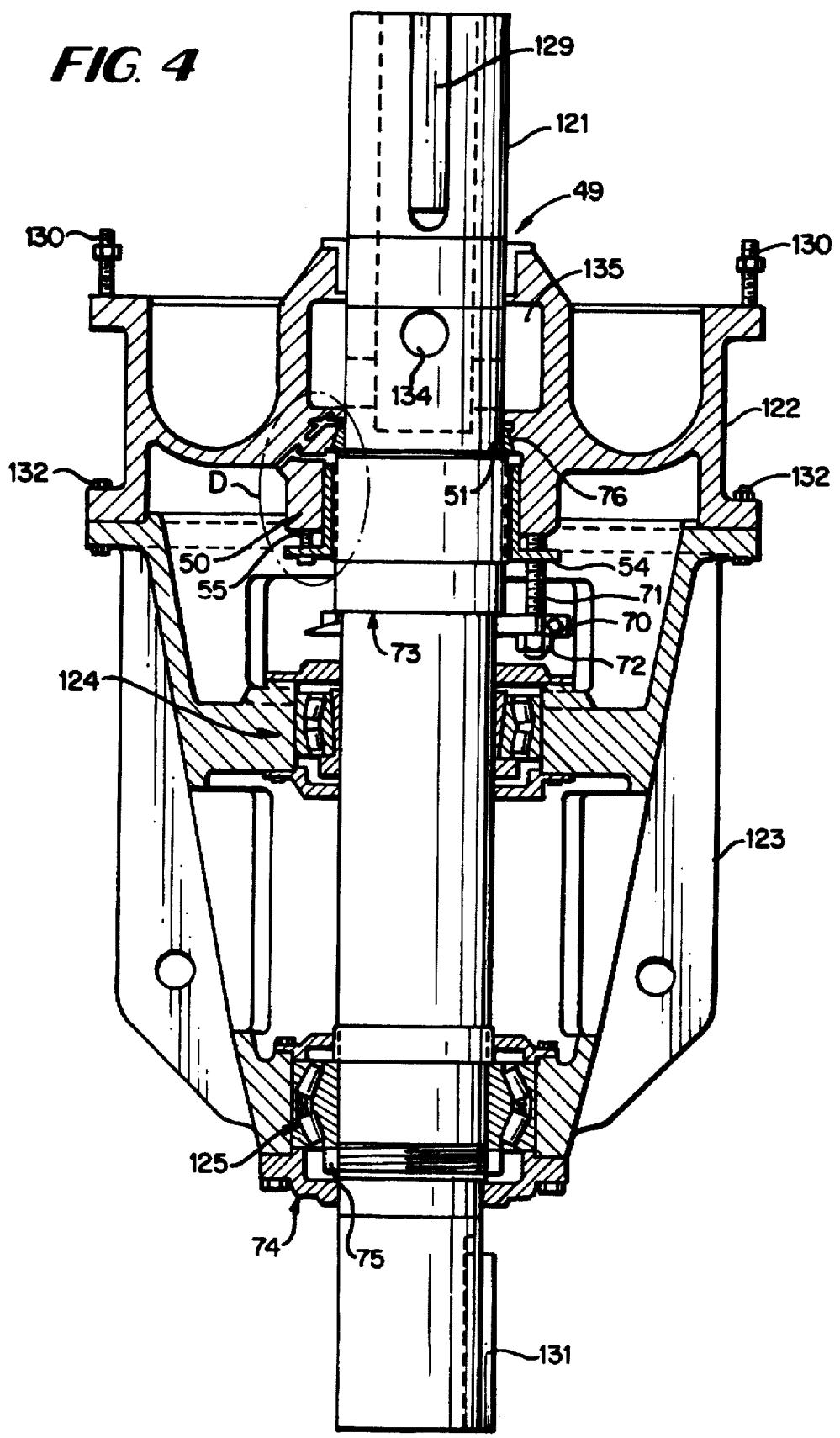
FIG. 4 is a view like that of FIG. 2 of an exemplary apparatus according to the present invention.
Figure 5:
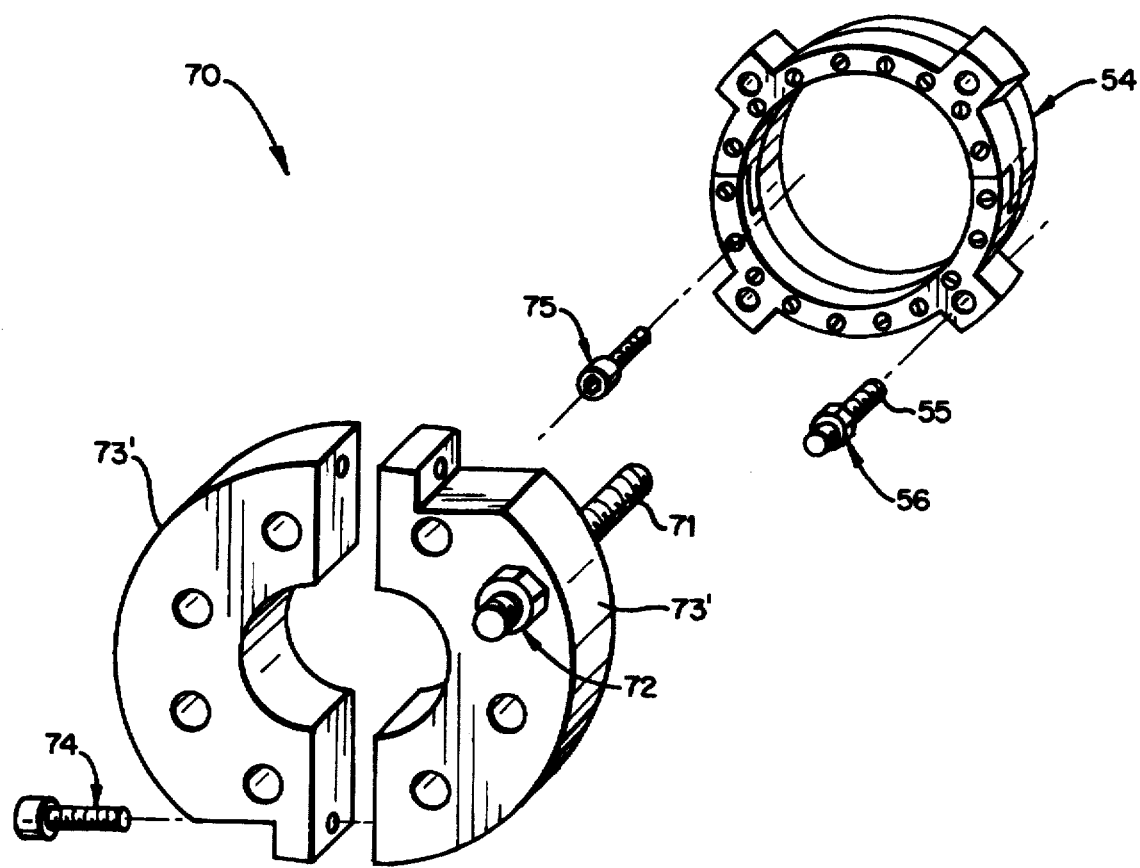
FIG. 5 is a top perspective view of an exemplary shelf-engaging support, and packing gland, of the structure of FIG. 4.
Figure 6:
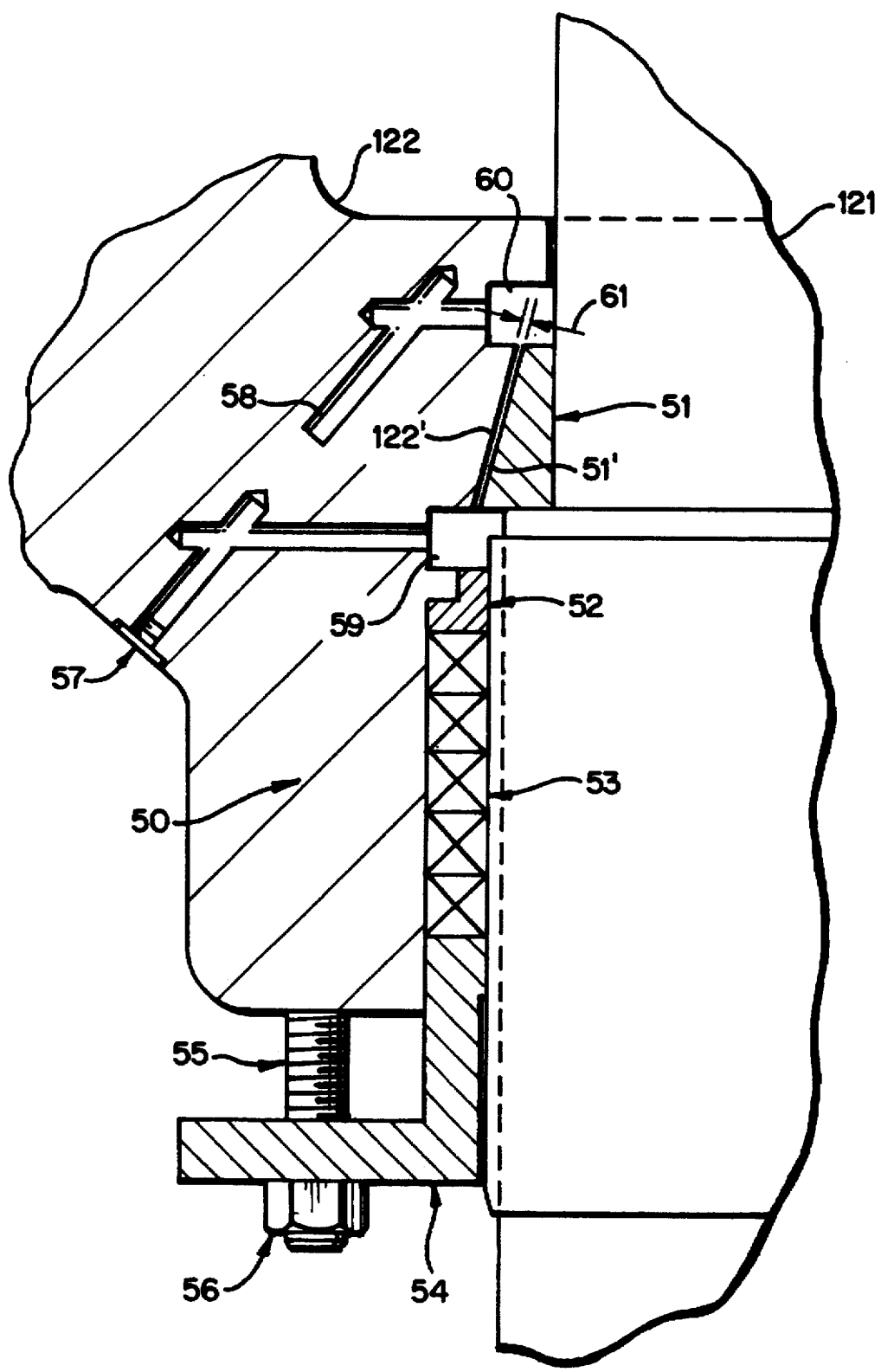
FIG. 6 is a detail side view of the area D of FIG. 4, partly in cross section and partly in elevation, of an exemplary embodiment of the bearing/sealing structures of the apparatus of FIG. 4.

FIGS. 4 through 6 illustrate one embodiment of apparatus according to the present invention which avoids the vessel evacuation and downtime when servicing which characterizes the prior art. FIG. 4 shows a drive shaft 121, an upper housing 122, and a lower housing 123. (Elements in FIGS. 4 through 6 which are similar in appearance and function to elements in FIGS. 2 and 3 are identified with corresponding numbers which are preceded by a "1".) The drive shaft 121 has a first end with a drive key 129 which engages the outlet device 11 shown in FIG. 1, and a second end having a second key 131 which engages a drive mechanism, for example, the gear reducer 14 of FIG. 1. The support structure shown in FIGS. 4 and 5 consists of an upper housing 122 which attaches to the bottom head 12 in FIG. 1, by means of threaded bolts or studs 130. A second housing 123 attaches to housing 122 via bolts or studs 132. The shaft and housing may also include one or more liquid distribution orifices 134 in communication with annular cavity 135 for distributing treatment fluid as described with reference to FIG. 2.

There are several distinctions between the prior art of FIGS. 2 and 3 and the typical embodiment of the present invention shown in FIGS. 4 through 6. Primarily, where in the prior art three sealing assemblies, in this case, packing boxes 26, 27 and 28, are required, only one pack box, 50, is needed for the present invention. The pack box 50 and associated structures greatly facilitate the servicing of the hardware in the housings 122 and 123, and the housings themselves. In addition, the upper pack box 26 of FIG. 2, is replaced by a cylindrical journal bearing 49. This replaceable bearing 49 is typically made from a reduced-friction plastic material, for example, Rulon® plastic supplied by Polymer Corporation, or a material containing PTFE, such as Dupont's Teflon® plastic, or their equivalents. The shaft 121 may also include one or more liquid deflectors or "flingers" 133 which protect the bearing assembly from leakage.

Pack box 50, shown in greater detail in FIG. 6, embodies one specific configuration for implementing the improvements of this invention. FIG. 6 shows a frusto-conical sealing ring 51, which is retained between the shaft 121 and the housing 122. Below sealing ring 51 is a conventional packing assembly such as a wear ring 52 a plurality of conventional packing rings 53 and a metal packing gland 54 which is retained by three or more studs 55 with nuts 56. The packing rings 53 are typically braided packing as supplied by Industrial Packing of Bucksport, Main, but any appropriate packing can be used. When nuts 56 are tightened, the gland 54 compresses the packing rings 53 which are compressed against the wear ring 52 and the shaft 121 creating a liquid seal around the shaft 121. Also provided are one or more purge water connections 76 (see FIG. 4) supplying clean mill water to annular cavities 59 and 60 to prevent debris from accumulating and fouling the sealing surfaces of packing rings 53 or running clearances of rings 51, 52, or 54. Typically, this purge water is supplied at a pressure higher than the process pressure to prevent the process liquids from leaking. The purge water typically is of such small volume that is does not interfere with the process. Note that the seal between the packing rings 53 and the shaft 121 may not be water-tight and some of the purge water may be allowed to pass between the rings 53 and shaft 121 so that this sealing surface is purged of debris which could damage the seals and shaft.

Though the sealing ring 51 is typically a separate two-piece ring distinct from the shaft 121, it may also be integral with the shaft. For example, the ring bearing surface 51 may be machined into the shaft and the bearing surface treated as described below. The ring 51 may also be attached to the shaft by, for example, bolts or screws, or shrunk fit onto the shaft or threaded onto the shaft by an internal screw thread on the inside diameter of the ring. The ring 51 moves with the shaft at least during reciprocation to effect sealing as described hereinafter.

During normal operation, with the shaft 121 rotating at about 5 to 10 rpm, a clearance, 61 exists between the housing bearing surface 122' of housing 122 and the outer bearing surface 51' of seal ring 51 so that there is little or no interference with the ring 51. This clearance 61 is typically between 0.01 and 0.50 inches, but is preferably between 0.03 and 0.125 inches. This running clearance 61 is typically lubricated, cooled and purged by means of purge water added via conduits 76.

The specific advantage of the invention occurs when housings 122 and 123 the pack box 50 or bearings, 124 or 125 need to be serviced. In the conventional design shown in FIG. 2, when the bearings 24 and 25 or pack boxes 26, 27 or 28 need to be serviced, the vessel must be evacuated. This requires significant downtime and loss of production. However, the present invention does not require that the vessel be emptied. The process and apparatus of this invention as applied to the sealing means is illustrated in FIG. 4. This figure shows maintenance hardware that is only installed when servicing the assembly, for example, for preventive maintenance or when hardware is damaged. This hardware comprises a shaft support structure for supporting the shaft 121 to allow servicing of the shaft components 50, 124, 125, etc. The shaft support structure includes a shaft support collar 70 and a plurality of jacking studs 71 and a plurality of nuts 72 used in conjunction with gland 54. The left side of FIG. 4 shows the normal, operational, position of the shaft 121 with the deflector 133 in place. The right side of FIG. 4 shows the deflector removed and the support collar 70 in place, with the shaft 121 stationary.

As seen in FIG. 5 the support structure 70 may comprise at least one ledge engaging element 73', and preferably a plurality of metal (e.g. steel) elements 73', that are shaped, positioned, and dimensioned so that they receive the removable fasteners (e.g. studs 71) and do not interfere with the metal packing gland 54 (which also may be segmented), and fasteners 55 and nuts 56 associated therewith. Element 73' may consist of two complementary elements held together by fasteners, for example, capscrews 74. Furthermore, gland 54 may consist of multiple elements held together by fasteners 75. The elements forming the collar 70 are typically attached to each other as well as to the studs 71, and collectively comprise a substantially continuous collar, engaging the ledge 73 (which also is preferably substantially continuous, and as seen in FIG. 4).

While an exemplary structure 70 is illustrated, it is to be understood that a wide variety of other structures also could be provided, or sealing can be provided between the surfaces 51', 122' merely by injecting a sealing compound in the clearance therebetween, which hardens to form a seal, and which can then be subsequently removed by injecting a dissolving fluid or simply disintegrate when the seal is broken.

While the shaft is stationary (e.g. disconnected from drive 14, or positively immobilized), the finger 133 is removed and support collar 70, typically in two sections 73, is assembled onto the shaft 121 so that it engages a shoulder or ledge 73 on the shaft 121. The threaded studs 71, for example 2-inch UNC studs, are threaded though holes in packing gland 54 and into threaded holes in the housing 122. (Due to the limited space available, the gland 54 may be specially designed with external lobes which engage the gland-securing bolts 55, see FIG. 6, and avoid the jacking studs 71.) The nuts 72 are then threaded onto the studs 71. The nuts 72 are sequentially tightened so that they engage the support collar 70. Then, to permit the shaft, 121, to move, the lower bearing cover 74 is removed and the bearing locking plate 75 is removed. The shaft 121 is then only supported by the collar 70 on ledge 73, as seen on the right side of FIG. 4. The nuts 72 are then tightened so that the shaft 121 is lifted via the plate 70 until the sealing ring outer surface 51' (see FIG. 6) contacts the housing surface 122'. All nuts 72 are tightened so that the shaft is secured and a seal is produced between the seal ring surface 51' and the housing surface 122'. Now, with the vessel contents intact, and possibly even pressurized, the seal assembly 50 or the bearing assemblies 124 and 125 can be serviced. Note that the shaft 121 may also be lifted and the bearing surfaces 51', 122' engaged by simply pushing up on the far end of the shaft 121. After servicing, with minimal downtime and minimal impact upon production, the procedure is reversed and the outlet device can be placed back in operation.

The invention may also include a means for rapidly sealing the seal 50 should the pressurized contents escape passed seal ring 51 and endanger the personnel servicing the shaft hardware. For example, one or more leak-sensing passage 57 may be provided such that should the high pressure contents of the vessel pass the ring 51 the service personnel would be alarmed or notified. This "tell-tale" leak detection may simply consist of a stream of water that is introduced to one or more passages 58 and discharged out passages 57. Should a process fluid leak from the vessel or should the fluid introduced at 58 leak through the seal, the flow will appear out of the discharge 57 and alert the service personnel. This alarm may also consist of a pressure gage or a pressure sensing device inserted into passage 57 that activates an audible or visual alarm should any increase in pressure be detected. Also, the pressure detection device could activate an automated leak sealing mechanism. One mechanism that could be activated is one that automatically injects a sealing compound via one or more conduits 57 or 58 into cavities 59 and 60 to prevent leakage. One such compound that could be used is Furmanite™ sealing compound provided by Furmanite Engineering of La Porte, Tex. The sealing injection mechanism may also be activated manually.

If leakage is detected, the shaft can be lifted further by, for example, tightening the nuts 72 further. If leakage still occurs, a sealing compound can be injected into passages 57 or 58. Also, as an alternative, and to ensure that a fluid-tight seal is maintained by the seal ring 51, the sealing compound, for example Furmanite, may be injected into the clearance between surface 122' and 51' prior to raising the shaft 121. By inserting the sealing compound prior to raising the shaft the compound will be compressed between the two bearing surfaces 51', 122' when the shaft 121 is raised to ensure a fluid-tight [if desired, pressure-tight] seal.

Ring 51 is typically made from carbon steel, but it can be made from a corrosion-resistant metal such as stainless steel or a nickel-alloy. The bearing surface 51' on the ring 51 or the bearing surface on the housing 122' are preferably very smooth or polished to ensure an adequate seal. One or both of these surfaces 51', 122' may be case hardened, surface treated or coated with hard a material, such as a chromium-containing material or titanium dioxide or their equivalents, to ensure a smooth, wear resistant surface. The height of the ring, 51, in this specific application is typically less than 5 inches, preferably less than 2 inches, to minimize the potential for asperities or deviations in the contacting surfaces and to thus prevent leakage when engaged. Of course, the optimum height of the ring 51 depends upon the application.

Again, this invention is not limited to application to continuous digesters, but is applicable to any vessel in which there is a penetration of the shell that can potentially result in leakage. It is particularly applicable to vessels, pressurized or unpressurized, which treat comminuted cellulosic fibrous material, for example, continuous digesters, batch digesters, impregnation vessels, or any other pre- or post-treatment vessels, including washing and bleaching vessels. This invention is also not limited to outlet or discharge devices but is also applicable to any pressurized or unpressurized vessel having devices for introducing material to a vessel, for example, conventional top separators, as sold by Ahlstrom Machinery, or any other form of agitator. This invention can also be used for mixers, degassing devices, or invasive instrumentation, for example, digester level indicators.

The sealing device is not limited to the packing shown in these figures, but any sealing mechanism can be used including mechanical seals and elastomeric seals. While the invention has been herein shown and described in what is presently conceived to be the most practical and preferred embodiment thereof, it will be apparent to those of ordinary skill in the art that any modifications may be made thereof within the scope of the invention, which scope is to be accorded the broadest interpretation of the appended claims so as to encompass all equivalent structures and methods.

What is claimed is:

1. Apparatus for preventing fluid leakage from a vessel having a shaft penetrating the vessel during servicing of shaft components, comprising:

a first bearing surface that is substantially stationary with respect to said vessel;

a second bearing surface mounted to and movable with said shaft, and during normal operation of said shaft is spaced from said first bearing surface;

said first and second bearing surfaces operatively located closer to said vessel than the shaft components to be serviced; and a shaft support structure for supporting said shaft to allow servicing of the shaft components, said shaft support structure engaging said shaft when stationary and moving at least part of said shaft with respect to said vessel so that said first and second bearing surfaces come into substantially liquid-tight sealing engagement with each other, allowing servicing of the shaft components without emptying said vessel.

2. Apparatus as recited in claim 1 wherein said first and second bearing surfaces are substantially conical mating surfaces.

3. Apparatus as recited in claim 2 wherein said conical mating surfaces having a length along said shaft of less than 5 inches; and wherein conical mating surfaces are metal, and wherein at least one of said metal conical mating surfaces is case hardened, or surface treated or coated with a hard material, providing a smooth wear-resistant surface.

4. Apparatus as recited in claim 1 further comprising a cylindrical journal bearing between said shaft and said vessel opposite said first bearing surface from said second bearing surface.

5. Apparatus as recited in claim 1 wherein said shaft comprises a ledge; and wherein said shaft support comprises at least one ledge engaging element, and a first plurality of removable fasteners extending from said ledge engaging element into removable contact with said vessel.

6. Apparatus as recited in claim 5 wherein said ledge is substantially continuous, and said at least one ledge engaging element comprises a multi-piece collar, each piece of said multi-piece collar engaging said ledge and connected by a said removable fastener to said vessel.

7. Apparatus as recited in claim 5 wherein one of said shaft components comprises a packing including a packing gland connected by a second plurality of removable fasteners to an outer portion of said vessel; and wherein said first plurality of fasteners are connectable to said outer portion of said vessel adjacent said second plurality of fasteners, and wherein said packing gland is dimensioned and shaped to be removable from said packing without interference from said at least one ledge engaging element.

8. Apparatus as recited in claim 7 wherein said shaft components further comprise at least one bearing assembly for mounting said shaft for rotation or reciprocation during use; and wherein said first and second bearing surfaces are substantially conical metal mating surfaces.

9. Apparatus as recited in claim 1 wherein said shaft support structure is reciprocal with respect to said vessel to move said second bearing surface into substantially liquid-tight engagement with said first bearing surface.

10. Apparatus as recited in claim 1 wherein the vessel comprises a cellulose pulp containing vessel, and the shaft is rotatable to act on pulp within said vessel; and wherein one of said shaft components comprises a packing including a packing gland connected by a second plurality of removable fasteners to an outer portion of said vessel; and wherein said shaft support structure is connectable by a first plurality of fasteners to said outer portion of said vessel adjacent said second plurality, and wherein said packing gland is dimensioned and shaped to be removable from said packing without interference from said shaft support structure.

11. Apparatus as recited in claim 1 further comprising means for injecting a sealing compound between said first and second bearing surfaces.

12. Apparatus as recited in claim 1 further comprising means for sensing if there is an ineffective seal between said first and second bearing surfaces.

13. A shaft assembly comprising:
a shaft having an axis of elongation, a first end, a second end, and a ledge between said first and second ends;
a packing, including a packing gland, mounted on said shaft spaced from said first end thereof, and closer to said first end than is said ledge;
at least one ledge engaging element engaging said ledge and closer to said second end than is said packing gland; and
a plurality of removable fasteners operatively connected to said at least one ledge engaging element and capable of connecting said element to a stationary surface and drawing said element, and said shaft, toward the stationary surface;
said packing gland and said at least one ledge engaging element being positioned, shaped and dimensioned so that said packing gland can be moved away from said packing, toward said shaft second end, without interference by said at least one ledge engaging element, so that said packing may be serviced.

14. A shaft assembly as recited in claim 13 further comprising a bearing surface mounted on said shaft for at least reciprocal movement therewith, for engaging a complimentary stationary bearing surface and providing substantially liquid-tight engagement therewith.

15. A shaft assembly as recited in claim 14 wherein said shaft bearing surface comprises a conical metal surface having a length along said axis of less than 5 inches.

16. A shaft assembly as recited in claim 14 wherein said ledge is substantially continuous, and said at least one ledge engaging element comprises a plurality of elements connectable to each other and to said plurality of removable fasteners.

17. A shaft assembly as recited in claim 14 further comprising at least one bearing assembly mounted to said shaft and closer to said shaft second end than is said ledge.

18. A method of servicing shaft components, including at least one of a bearing assembly and a sealing assembly, of a vessel having fluent material in an interior thereof, the shaft penetrating the vessel and moveable with respect to the vessel to act on the fluent material within the vessel, comprising the steps of substantially sequentially:

(a) terminating the fluent material acting movement of the shaft with respect to the vessel;

(b) providing a shaft support structure engaging said shaft;

(c) creating a substantially fluent material-tight seal between the shaft and the vessel by using said shaft support structure to move at least part of said shaft, the seal being between the interior of the vessel and the shaft components to be serviced;

(d) while the seal is maintained, servicing the shaft components, including at least one of a bearing assembly and a sealing assembly, without emptying the fluent material from the vessel; and (e) releasing the substantially fluent material-tight seal and initiating fluent material acting movement of the shaft.

19. A method as recited in claim 18 comprising the further step of sensing if the fluent material-tight seal is significantly leaking, and initiating action intended to correct the leakage.

20. A method as recited in claim 18 wherein step (b) is practiced by linearly moving a conical bearing on the shaft into operative engagement with a conical bearing on the vessel.

21. A method as recited in claim 20 wherein the shaft has a ledge supporting a leaking liquid deflector; and wherein step (b) is further practiced by replacing the deflector with at least one shaft supporting element which engages the ledge, and drawing the element toward the vessel.

* * * * *